(12) United States Patent
Anick et al.

(10) Patent No.: US 8,819,003 B2
(45) Date of Patent: *Aug. 26, 2014

(54) QUERY REFINEMENT BASED ON USER SELECTIONS

(71) Applicant: Yahoo! Inc., Sunnyvale, CA (US)

(72) Inventors: Peter Anick, Marlborough, MA (US); Ryan Grove, Portland, OR (US); Jeremy Hubert, San Francisco, CA (US)

(73) Assignee: Yahoo! Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/868,104

(22) Filed: Apr. 23, 2013

(65) Prior Publication Data

US 2013/0232399 A1 Sep. 5, 2013

Related U.S. Application Data

(63) Continuation of application No. 12/242,415, filed on Sep. 30, 2008, now Pat. No. 8,452,793.

(51) Int. Cl.
*G06F 17/30* (2006.01)

(52) U.S. Cl.
USPC .......................................... 707/726; 707/767

(58) Field of Classification Search
USPC ......................................... 707/751, 726, 767
See application file for complete search history.

(56) References Cited

U.S. PATENT DOCUMENTS

| 2004/0049541 | A1* | 3/2004 | Swahn ........................ 709/203 |
| 2006/0085401 | A1 | 4/2006 | Anderson et al. |
| 2007/0260597 | A1 | 11/2007 | Cramer |
| 2008/0114761 | A1 | 5/2008 | Gross et al. |
| 2008/0162817 | A1 | 7/2008 | Batterywala |
| 2009/0327267 | A1 | 12/2009 | Wong et al. |

FOREIGN PATENT DOCUMENTS

WO   WO 01/43399   6/2001

* cited by examiner

*Primary Examiner* — Albert Phillips, III
(74) *Attorney, Agent, or Firm* — Hickman Palermo Truong Becker Bingham Wong LLP

(57) ABSTRACT

A user selection of a link on a first webpage that is being displayed is received. A copy of the first webpage is stored in cache memory at a local client machine. Responsive to receiving the user selection of the link: the copy of the first webpage stored in the cache memory is modified at the local client machine to include metadata associated with the user selection of the link on the first webpage; and a second webpage associated with the link is presented. A request to reload the first webpage is received. Responsive to receiving the request to reload the first webpage: the metadata from the first webpage stored in the cache memory is obtained; a third webpage based on the metadata is obtained; and the third webpage is displayed.

20 Claims, 7 Drawing Sheets

QUERY REFINEMENT BASED ON USER SELECTIONS

This application is a continuation of and claims priority to U.S. patent application Ser. No. 12/242,415 entitled QUERY REFINEMENT BASED ON USER SELECTIONS, filed on Sep. 30, 2008, the contents of which are hereby incorporated by reference in their entirety for all purposes.

FIELD OF THE INVENTION

The present invention relates to search technologies in general. More specifically, the invention relates to modifying search results based on user selections within the search results.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Search engines are software applications for searching the Internet based on search queries. Search results provided by search engines in response to search queries usually list a series of Internet addresses. The Internet addresses in the series are usually included in the search result because such Internet addresses have been sufficiently popular that a large number of other web sites have added hyperlinks to the Internet addresses.

SEARCH ENGINES, URLS AND HYPERLINKS

When a user wants to search for information, typically, the user on a client machine enters a search query, i.e., search criteria (including keywords, symbols, numbers, selections and/or other suitable input) on an interface within a web browser application. To obtain input, the interface displays a web page of a search engine with input fields. The web browser application provides the search criteria to the search engine for executing a search with the search criteria. In response, the search engine returns a search results web page to the client machine, which includes search results that are a series of "hyperlinks" (also called "hypertext links" or "links") to Internet addresses which are most relevant to the search criteria. The Internet addresses listed in the search result provide the information the user is searching for. Typically, the Internet addresses listed are ranked in order of likelihood of relevance to the originally submitted search criteria, with the Internet address nearest to the top of the displayed search result being the most relevant to the originally submitted search criteria with a highest ranking, and reducing in relevancy as each Internet address is listed on downwards on the web page. Further, the search results may include an abstract of the content found at each Internet address, a hyperlink to the Internet address, and a hyperlink to a cached copy of the data found at the Internet address. In order to be displayed, the search results web page is generally first stored in local cache within the client machine and then the locally stored copy is displayed on the interface within the web browser application. To view a search result, a user then selects a hyperlink corresponding to one of the search results by any input method that can select such text or graphic, such as, but not limited to, a mouse, keyboard, speech recognition, touch, motion detection, pupil detection, etc. The selection of the hyperlink causes the web browser application (or some other software or hardware) to retrieve or receive data found at an Internet address associated with the hyperlink and replace the content of the interface with the received data. The data received or retrieved may be any type of data, such as, but not limited to, text, images, video, audio, or data stored according to some proprietary format, such as Portable Document Format ("PDF") from Adobe Acrobat. The data may be downloaded and stored at a user's location or streamed to the user's location and displayed within a web page.

If the user wishes to view another search result, the user returns to the search results web page by using the "back" functionality of most web browser applications or selecting the Uniform Resource Locator (URL) corresponding to the search results web page, e.g., from a URL history within the web browser application. In response, the web browser application displays the locally stored search results web page with the same previously displayed search results based only on the original search criteria, in the same order previously displayed. By loading exactly the same web page as previously displayed, the web browser application does not make any use of the user's selection within the search results. Accordingly, the web browser application provides a static search results web page that is never modified or adapted to the user's selections within the search results web page. Therefore, in order to get a new set of search results the user has to manually enter a new search criteria and request an altogether new search from the search engine.

A URL is a string of alphanumeric characters that references an Internet address. Different URLs may reference the same Internet address. For example, the URL may be "http://87.248.113.14", or "http://www.yahoo.com", which both reference the same Internet address. Some Web services allow for creating any arbitrary URL to reference an Internet address. For example, www.tinyurl.com allows creating a short URL to reference an Internet address that would otherwise be referenced by a long, convoluted URL. Typically, an URL is composed of an access protocol, a domain name, and perhaps the path to the file. For example, if the URL is "http://www.yahoo.com/sports", then the access protocol is "http://", the domain name is "www.yahoo.com", and the path is "/sports". An URL may be composed of other access protocols with other domain names or paths.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
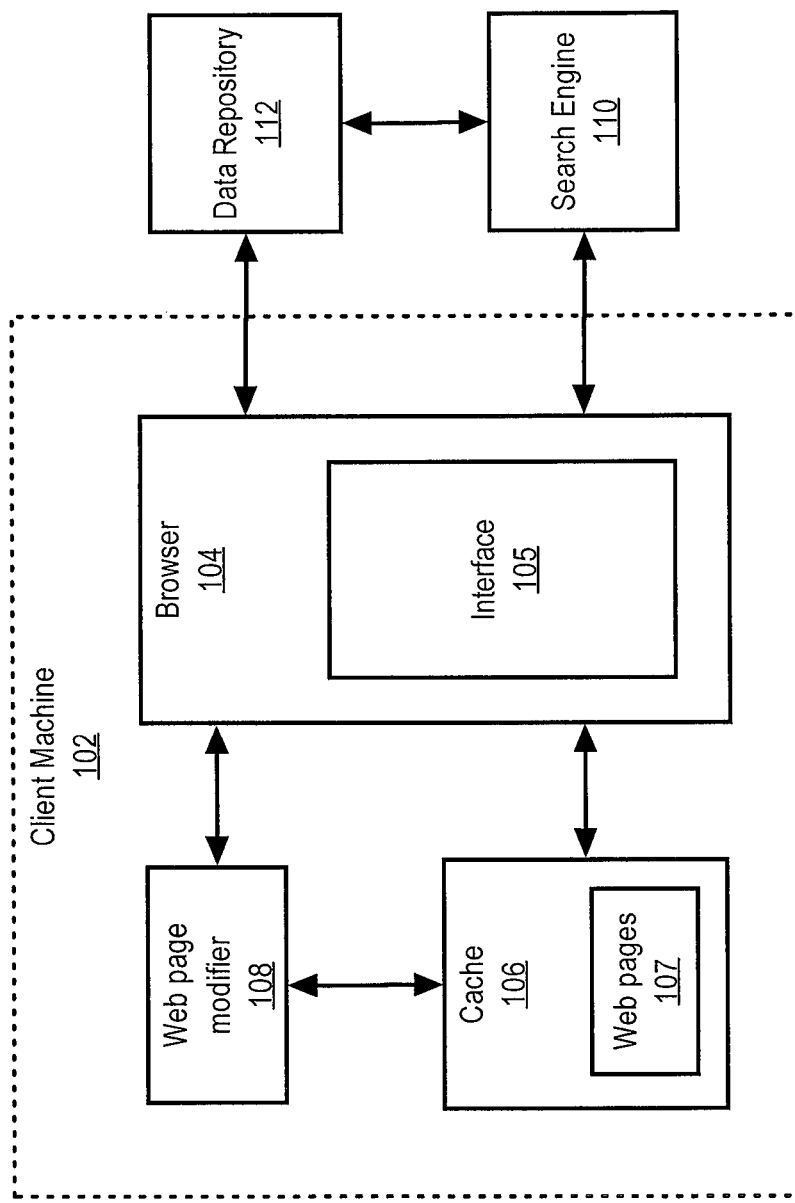
FIG. 1 is a block diagram illustrating an embodiment for dynamically modifying search results based on the user selections.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Several features are described hereafter that can each be used independently of one another or with any combination of the other features. However, any individual feature might not address any of the problems discussed above or might only address one of the problems discussed above. Some of the problems discussed above might not be fully addressed by any of the features described herein. Although headings are provided, information related to a particular heading, but not found in the section having that heading, may also be found elsewhere in the specification.

Overview

A method for dynamically modifying search results based on user selections within the search results themselves is provided. Users of search engines often traverse through many different search results in order to find a suitable document (defined to include any representation of data including but not limited to text, images, video, audio, or other suitable form). A user selection of a search result frequently indicates that the user is particularly interested in results similar to the selected document. For example, for search results displayed with abstracts, the user generally reads the abstract prior to selecting a search result, indicative of the selected search result being relevant. Furthermore, a user's interaction within a document corresponding to a selected search result also indicates a level of document relevance to the particular user. Accordingly, based on the user's selection of and interaction with each of the search results, the display of search results may be dynamically adapted and/or modified in accordance with one or more embodiments of the invention. Specifically, based on the user selections within the set of search results, the search results may themselves be dynamically re-ranked, re-ordered, re-abstracted, or otherwise modified. Furthermore, based on the user selections within the search results, a new search criteria may be generated and used for performing new searches such that the new search results dynamically change with every user selection of a search result.

In an embodiment, the new search criteria are determined based on multiple user selections within the previous search results. In an embodiment, multiple previous user selections are weighed in proportion to the level of user interaction with each of the multiple user selections for determining the new search criteria.

In an embodiment, upon receiving a user selection of a link on a locally cached web page, the locally cached web page is modified to include metadata associated with the link. In an embodiment, a timestamp is stored in a locally cached web page that corresponds to a time a user request was received for a link on the web page; and an elapsed time is determined when a request to reload the locally cached web page is received. In an embodiment, when a request to reload a web page is received, a different web page is obtained based on the previous user selection of the requested web page. In yet another embodiment, the previous user selection is weighted based on the elapsed time between a time of the user selection and a time of the request to reload the original web page.

Although specific components are recited herein as performing the method steps, in other embodiments agents or mechanisms acting on behalf of the specified components may perform the method steps. Further, although the invention is discussed with respect to components distributed over multiple systems (e.g., a web browser on a client machine and a search engine on server), other embodiments of the invention include systems where all components are on a single system (e.g., a search for documents on a personal computer). Furthermore, embodiments of the invention are applicable for dynamically modifying any set of search results (e.g., obtained over a network, a local machine, a server, a peer machine, within a software application, etc.).

While specific embodiments of the invention are described in which search results are dynamically modified, the techniques described herein are not limited to the disclosed embodiments of the invention and the techniques described herein may be applicable to other embodiments.

System Architecture and Functionality

Although a specific computer architecture is described to perform the invention, other embodiments of the invention are applicable to any architecture that can be used to modify search results based on user selections within the search results themselves.

FIG. 1 shows a system in accordance with one or more embodiments of the invention. As shown in FIG. 1, the system includes a client machine (102), a search engine (110), and a data repository (112).

In one or more embodiments of the invention, the data repository (112) corresponds to any data storage device (e.g., local memory on the client machine (102) itself, multiple servers connected over the internet, systems within a local area network, a memory on a mobile device, etc.) known in the art which may be searched based on a search criteria to obtain search results. In one or more embodiments of the invention, access to the data repository (112) may be restricted and/or secured. As such, access to the data repository (112) may require authentication using passwords, secret questions, personal identification numbers (PINs), biometrics, and/or any other suitable authentication mechanism. Those skilled in the art will appreciate that elements or various portions of data stored in the data repository (112) may be distributed and stored in multiple data repositories (e.g., servers across the world). In one or more embodiments of the invention, the data repository (112) includes flat, hierarchical, network based, relational, dimensional, object modeled, or data files structured otherwise. For example, data repository (112) may be maintained as a table of a SQL database. In addition, data in the data repository (112) may be verified against data stored in other repositories.

In an embodiment, the search engine (110) corresponds to hardware and/or software that can be used to search the data repository (112) based on a search criteria received from the client machine (102). Although shown outside of the client machine (102), the search engine (110) may be resident on the client machine (102) itself, e.g., the search engine (110) may correspond to a search program used for searching local memory on the client machine (102). The search engine (110) may include any functionality known in the art to perform a search of the data repository (112). For example, the search engine (110) may search for documents best matching the search criteria received from the client machine (102). In an embodiment, the search engine (110) may include functionality to rank and/or order the search results obtained from the data repository (112) based on the search criteria received from the client machine (102). Furthermore, the search engine (110) may include functionality to determine and/or obtain an abstract of a document corresponding to a search result. In an embodiment, the search engine (110) may include functionality to provide the document corresponding to the search result or provide a link to the document corresponding to the search result. For example, the search engine (110) may present a web page with the search results as a list of hyperlinks that are mapped to specific internet addresses. Alternatively, the search engine (110) may provide the documents themselves to the client machine (102). In one or more embodiments of the invention, when the search engine (110) is a part of a software application, the search engine (110) may simply list the documents embedded with a local path to the document itself. For example, in a medical advice application running on a handheld device, the search engine (110) may simply correspond to a process for searching the locally stored medical data and providing a list of the medical data for display on an interface within the handheld device. In another example, the search engine (110) may be a web-based application available on a website such as www.yahoo.com, and may be able to search the internet for any search criteria. In yet another example, the search engine may correspond to one or more applications on separate client machines, e.g., in a peer to peer network for exchanging media files. In this scenario, a search engine (110) may be resident upon each peer within the peer to peer network and include functionality to search the respective peer and provide the search results to a requesting peer machine.

In an embodiment, the client machine (102) corresponds to any system used for requesting a search. As shown in FIG. 1, the client machine (102) includes a browser (104), an interface (105), a cache (106), and a web page modifier (108). The interface (105) corresponds to any sort of interface adapted for use to access the system and any services provided by the system in accordance with one or more embodiments of the invention. The interface (105) may be a web interface, graphical user interface (GUI), command line interface, or other interface accessible through a computer system. The interface (105) includes functionality to allow a user (or an automated equivalent) to enter a search criteria (including words, numbers, symbols, selections, or other suitable input) and be presented with search results. In an embodiment, the interface (105) is displayed within a browser (104).

The browser (104) corresponds to any program that may be used for providing a search criteria to the search engine (110) and requesting search results based on the search criteria. The browser (104) may reside on a client machine (102) (such as personal computers (PCs), mobile phones, personal digital assistants (PDAs), and/or other digital computing devices of the users) or may be executed remotely in conjunction with the client machine (102) to provide a search criteria to the search engine (110). The browser (104) may be a web browser application or simply an application for browsing and/or searching local files on the client machine (102) or local network. In an embodiment, the browser (104) includes functionality to store web pages (107) to the cache (106) and load web pages (107) from the cache (106). Although the specification discusses search results within a web page (107) stored on a cache (106), other embodiments of the invention, apply to search results stored in any format on any type of memory. For example, a browser (104) that is used to search for documents on a local machine may store the search results in a table on the cache (106). In an embodiment, the cache (106) may correspond to any memory associated with the client machine (102). Further, although the cache (106) is shown within the client machine (102), in an embodiment, the cache (106) may correspond to memory separate from the client machine (106).

In an embodiment of the invention, the browser (104) may include functionality to obtain and load a web page different than the web page requested by a user. The browser (104) may include functionality to obtain and/or receive a web page based on previous user selections. For example, when a request to load a locally cached web page is received, the browser may be configured to first obtain data (from the locally cached page or other source) related to previous user selections. Based on the previous user selections, the browser may obtain a new web page or modify the locally stored web page and present the newly obtained or modified web page in response to a request for the original web page stored in cache. The methods for obtaining a new web page or modifying a previous web page are discussed in further detail below.

In an embodiment, the web page modifier (108) corresponds to software and/or hardware component for modifying web pages (108) stored in the cache (106). The web page modifier (108) may be a separate component or may be a part of the browser (104). In an embodiment, the web page modifier (108) includes functionality to store metadata within a locally stored web page or elsewhere in the cache (106). The metadata may include any information related to user interaction on a web page (108). For example, if a user selects a link on the web page (108), the web page modifier (108) may modify the locally stored version of the web page (108) by storing the link selected by the user, the time the link was selected, the document corresponding to the link, or any other suitable information associated with the link.

Each of these components described above may be located on the same device or may be located on separate devices coupled by a network (e.g., Internet, Intranet, Extranet, Local Area Network (LAN), Wide Area Network (WAN), etc.), with wire and/or wireless segments. In one or more embodiments of the invention, the system is implemented using a client-server topology. The system itself may be an enterprise application running on one or more servers, and in some embodiments could be a peer-to-peer system, or resident upon a single computing system. In addition, the system is accessible from other machines using one or more interfaces (e.g. interface (105), web portals, or any other tool to access the system). In one or more embodiments of the invention, the system is accessible over a network connection (not shown), such as the Internet, by one or more users. Information and/or services provided by the system may also be stored and accessed over the network connection.

Dynamic Content Selection Based on User Selection

FIGS. 2-6 show flow charts for dynamic content selection based on previous user interaction in accordance with one or more embodiments of the invention. In one or more embodiments of the invention, one or more of the steps described below may be omitted, repeated, and/or performed in a different order. Accordingly, the specific arrangement of steps shown in FIGS. 2-6 should not be construed as limiting the scope of the invention.

Figure 2:
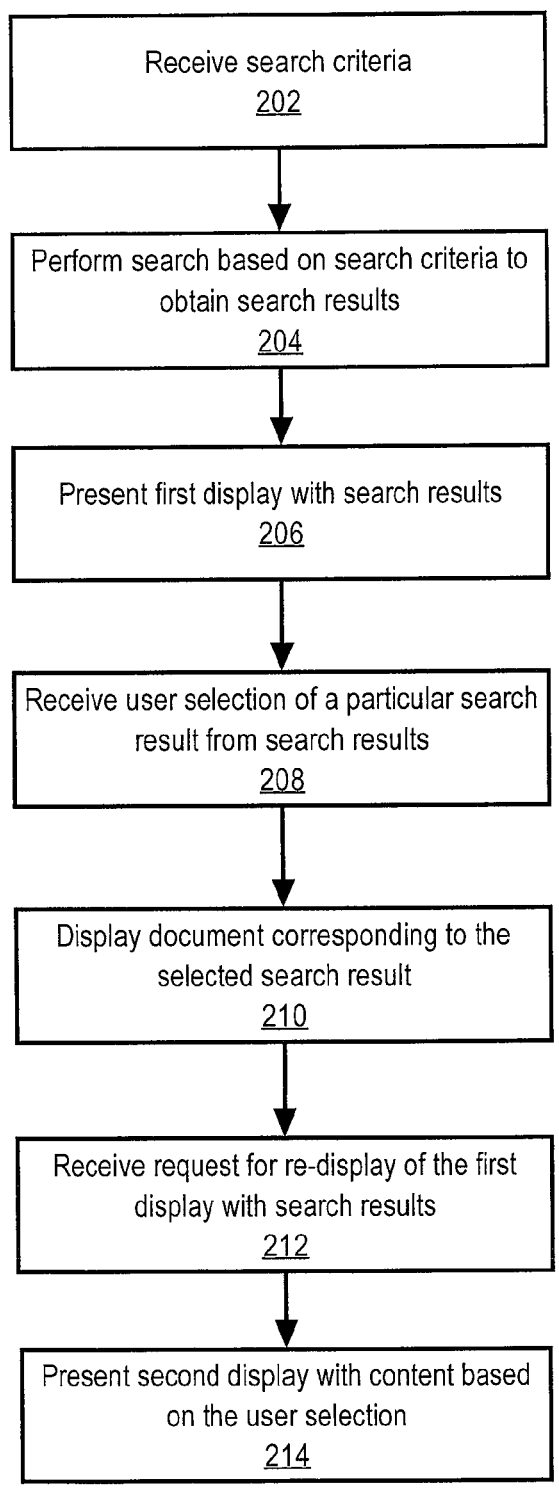
FIG. 2 is a flow diagram illustrating an embodiment for presenting content based on user selection.

FIG. 2 shows a flow chart for dynamic content selection based on user selections within search results. Initially, search criteria is received from a user and/or process (Step 202). The search criteria may be received through any input means known in the art. Examples of input means include a text interface, a graphical user interface (GUI), a file upload mechanism, a file read operation, etc. For example, a user may navigate to a web page such as www.yahoo.com and enter text to be used as a search criteria. Another example may involve a user uploading a short audio clip sample to search for a complete music track corresponding to the short audio clip sample. Yet another example, may involve a computer program automatically submitting each error code received as a search criteria to find and present the appropriate corrective actions to a network administrator along with the error code.

In an embodiment, a search is performed based on the search criteria to obtain a set of search results using any searching techniques described below or otherwise known in the art (Step 204). For example, the search may be performed by comparing at least a portion of the search criteria with documents in a specified domain to find occurrences of the search criteria within the domain. In an embodiment, the search criteria may be modified to include commonly used terms (e.g., different tenses of verbs within the search criteria, correct spelling of commonly misspelled words, etc) prior to performing the search. In an embodiment, the pre-determined domain for performing the search may correspond to a Wide Area Network (e.g., the internet), a local network, a single system or any other pre-determined domain.

The search results once obtained are displayed to a user for selection (Step 206). The search results may be displayed on a simple web page, within a frame on a web page, within an applet executing on the web page, within a desktop application, or in any other suitable manner. In an embodiment, the web page that was used to submit a search query may be used for displaying the search results by simply replacing a portion of the web page rather than obtaining a new web page to display the search results (e.g., using asynchronous JavaScript and XML (AJAX)).

Next a user selection of one of the search results is received (Step 208). The user selection may be received using any input including but not limited to a keyboard input, a mouse click, hovering over the search result, a text message, an e-mail message, or any other suitable input for indicating a selection applicable to the display of the search results.

In response to receiving the user selection, a document corresponding to the user selection is displayed (Step 210). In an embodiment, a web browser displaying the search results web page may display a new web page in response to receiving the user selection. In another embodiment, a new window may be used to display the document corresponding to the user selection. In yet another embodiment, the document corresponding to the user selection may be locally stored and displayed within an application. For example, a selection within a set of search results under a help menu may result in display of the help topic within the application itself.

Next, a request to re-display the search results is received (Step 212). In an embodiment, where the browser first displayed a web page including the search results and then displayed a different web page displaying the document corresponding to the user selection, a request to re-display the search results may involve receiving a "back" button selection from the user to navigate back to the search results web page. In an embodiment, where AJAX is used to display the search results and a document corresponding to the user selection, the user may still select the back button of the browser to request re-display of the search results. In yet another embodiment, the user may navigate the history of visited web pages and select the web page containing the search results to request reloading of the search results. In another embodiment, a web page displaying the user selection may provide a link to return to the search results which may be selected to request re-display of the search results. Furthermore, one skilled in the art will appreciate there may be various other known methods for requesting the reloading of previously displayed search results.

In response to the request for re-display of the previously displayed search results, content is displayed that is based, at least in part, on the previous user selection(s) within the search results, in accordance with one or more embodiments of the invention. Examples of the different types of content that can be displayed based on the previous user selection(s), in accordance with one or more embodiments of the invention, are discussed below in FIGS. 3-5.

New Search Results Based on User Selections

Figure 3:
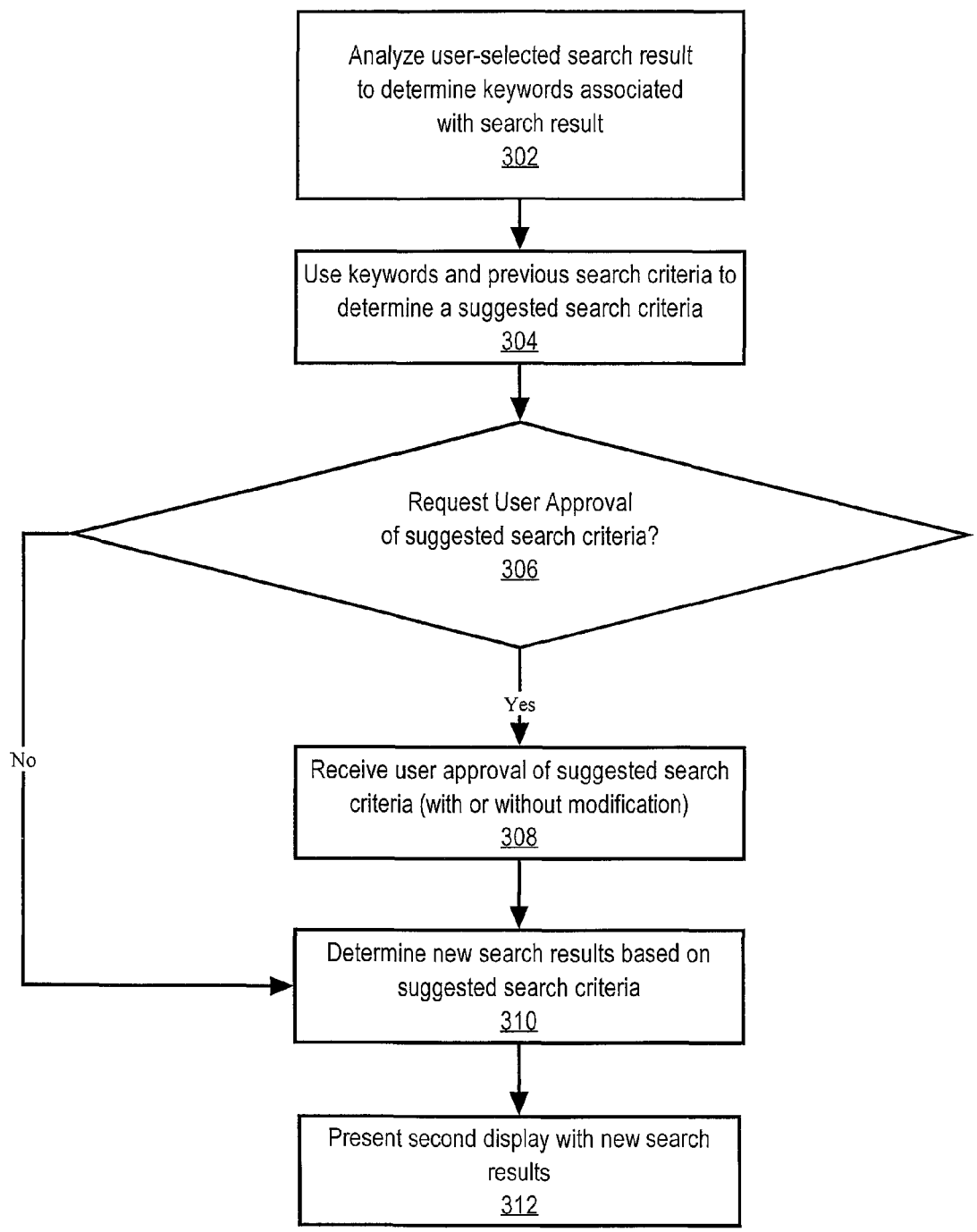
FIG. 3 is a flow diagram illustrating an embodiment for determining new search results based on a user selection within the previous search results.

In an embodiment illustrated in FIG. 3, the content displayed, in response to the request for re-display of the previously presented search results, includes new search results. In this embodiment, the document(s) corresponding to previous user selections may be analyzed to identify keywords associated with the document (Step 302). For example, frequently used words that appear throughout the document may be identified as keywords. In another example, any topics (e.g., section headers etc) within the document(s) may be identified as keywords. In yet another example, any metadata defining keywords associated with the document may be used to identify relevant keywords. In another example, the abstract of the document(s) corresponding to the user selection may be used. Accordingly, one or more methods discussed above or known in the art, may be used to identify keywords associated with the document. Furthermore, other portions of the document may also be used, e.g., graphics, embedded sound files, entire paragraphs, etc.

Based on the content from the document (e.g., keywords, graphics, etc.) a suggested search criteria is generated (Step 304). The suggested search criteria may include a portion or all of the identified keywords associated with the document. Furthermore, the suggested search criteria may also include a portion or all of the original search criteria submitted by the user. In an embodiment, a user approval may be requested for the suggested search criteria (Step 306). Accordingly, in order to request approval, the suggested search criteria may be presented to the user for approval and/or modification.

In response, a user may approve the suggested search criteria as is for a new search, or modify the suggested search criteria for a new search (Step 308). In an embodiment, the user may not wish to perform a new search at all and simply elect to view the previously displayed search results. Furthermore, in one or more embodiments of the invention, the steps of requesting and receiving user approval may be skipped altogether. Accordingly, the suggested search criteria may simply correspond to computer generated search criteria that is used by the system to perform a new search.

Once the suggested search criteria is finalized (i.e., using user approval or not using user approval), new search results may be determined based on the suggested search criteria (Step 310). In an embodiment, the new results may be determined using any known methods in the art. In an embodiment of the invention, the new search results may be selected from the previously presented search results. For example, if the original search criteria was used to find one hundred search results, the suggested search criteria may be used to search only within documents corresponding to those one hundred search results. Accordingly, in an embodiment, the number of search results may continually shrink based on each user selection, as the user selections are used to determine keywords which in turn, are used to search and/or filter the previously displayed search results based on the user selection within the search results. In another embodiment of the invention, the suggested search criteria may used to perform an entirely new search in the original domain or another specified domain, e.g., the internet, a local area network, or a local machine.

Ranking Based on User Selection

Figure 4:
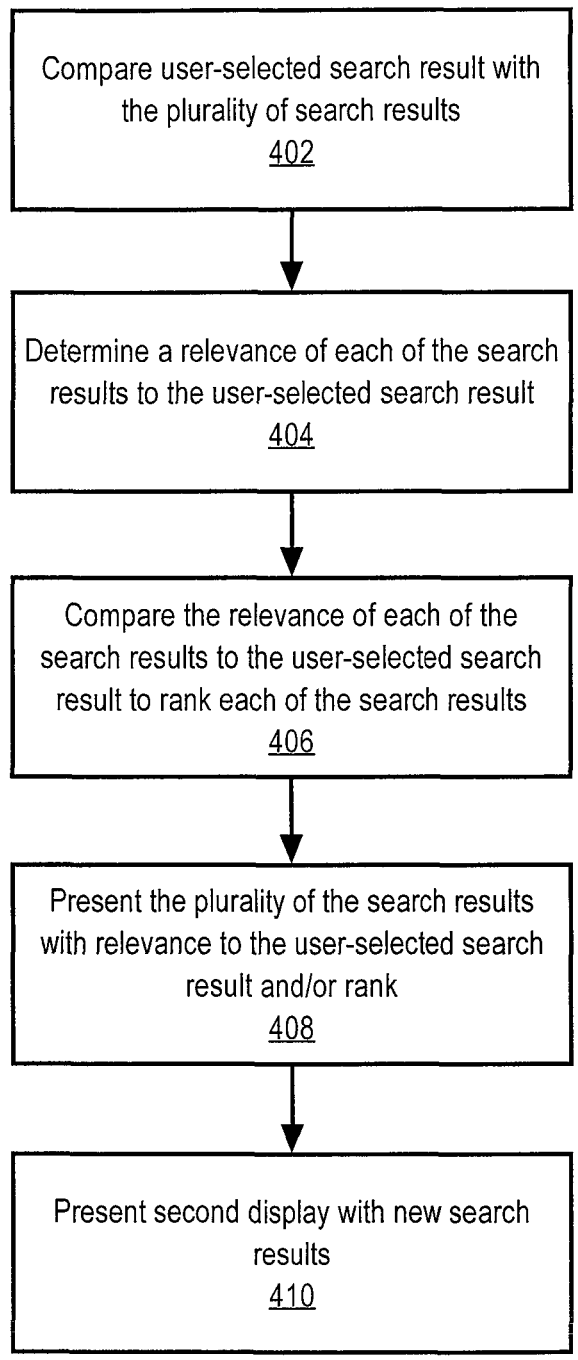
FIG. 4 is a flow diagram illustrating an embodiment for ranking and/or ordering the search results based on a user selection within the search results.

In an embodiment illustrated in FIG. 4, the content displayed, in response to the request for re-display of the previously presented search results, includes a ranking of the previously displayed search results or other indication of relevance to the user selection(s) within the search results. In an embodiment, the document (or a portion thereof, e.g., abstract) corresponding to the user selected search results is compared to each of the other search results (Step 402). In an embodiment, the comparison may involve a match between words from the documents. In another embodiment, the comparison may involve a categorization comparison. For example, if the search results are documents within a medical database categorized by illness or body part, the category of the user selected search result may be compared to the category of each of the other search results. In another embodiment, the comparison between documents may involve a comparison of document attributes such as authorship, date of publication, publishing entity, field of endeavor, type of document, or other suitable attribute.

Based on the comparison of each of the search results to the user selected search result, a relevance of each of the search results to the user selected search result is determined (Step 404). In an embodiment, the greater the match between the documents (e.g., repetitive keywords, common authors, common category, etc.) the more relevant a search result is considered to a user selected search result. Furthermore, based on the relevance of search results to the user selected search result(s), each of the search results may be ranked and/or re-ordered (Step 408). In an embodiment, the relevance to the user selected search result may be indicated by a graphical addition to the search results. For example, the most relevant search results may be indicated by highlighting, bold, stars, coloring, or other visual indications of relevance. Further, different levels of the visual indicia may indicate a level of relevance. For example, the darker the bolding, the more relevant to the user selected search results. In another embodiment, search results that are not relevant may in fact be all together removed from the list of search results. In another embodiment, the documents corresponding to the search results may be analyzed to generate a new abstract based on the user selected search results. For example, paragraphs within the documents corresponding to the search results may be selected as abstracts if words within that paragraph match document corresponding to the user selected search result. Accordingly, in an embodiment of the invention, the search results may dynamically be ranked, re-ordered, or re-abstracted based on user selections within the search results. In an embodiment with multiple user selections, the search results may be re-ranked and/or re-ordered with each user selection. Finally, the ranked and/or ordered search results based on the user selections are presented to the user (Step 410).

Interaction Based Weighting of User Selections

Figure 5:
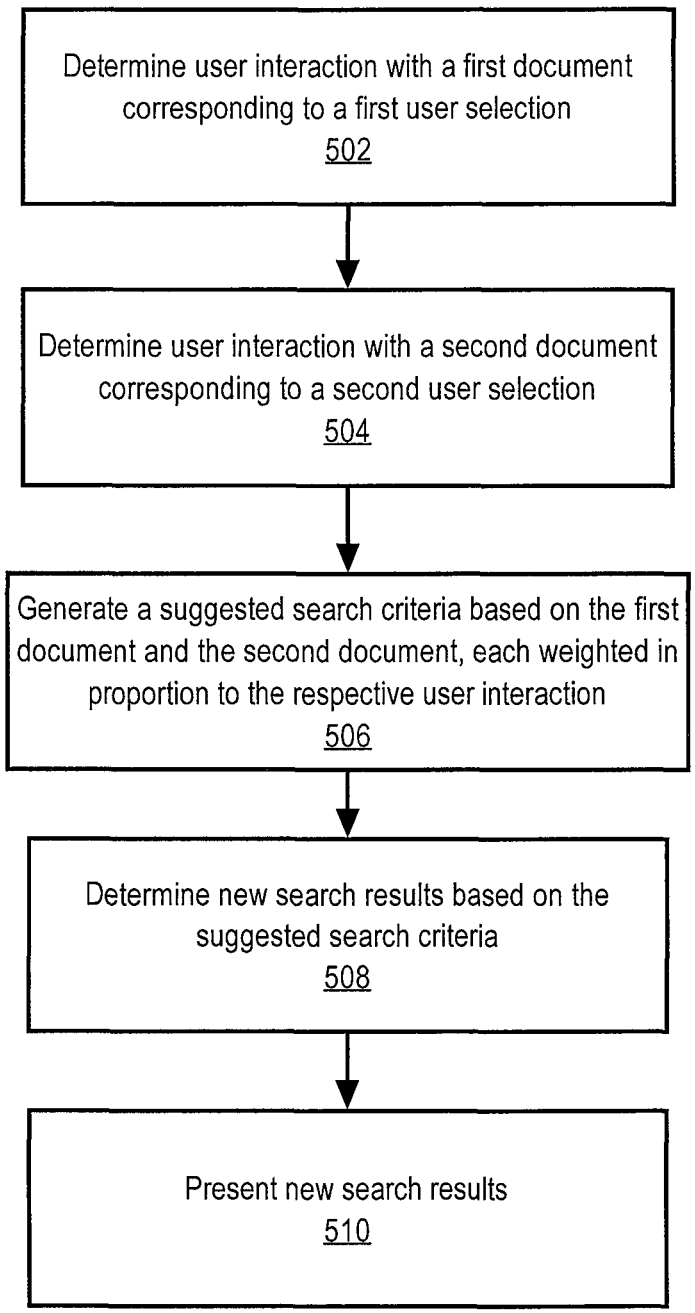
FIG. 5 is a flow diagram illustrating an embodiment for weighing search results to proportionately to respective user interaction to modify content of a web page.

In an embodiment illustrated in FIG. 5, the content displayed, in response to the request for re-display of the previously presented search results, is based on previous user selections that are weighted based on user interaction. For example, weighting of user selections can be useful to generate search criteria (as discussed above in relation to FIG. 3) or to rank and/or order search results (as discussed above in relation to FIG. 4). For simplicity weighing user interaction is described below in relation to generating search criteria.

In an embodiment of the invention, a user interaction with the a first document corresponding to a first user selection is determined (Step 502) and further, a user interaction with the a second document corresponding to a second user selection is also determined (Step 504). Determining a user interaction with a document may include determining the amount of time a user viewed the document. For example, when a single browser is used to display the search results and a user selects and views one of the search results, a time between selection of the search result and returning to the search results after viewing the selected search result may be calculated. Implementation of this method is further explained below in relation to FIG. 6. In an embodiment, a more specific user interaction may be determined. For example, the scrolling of a user with a selected document, the editing interaction (e.g., copying and pasting document contents into another document), the input provided to a document (e.g., where the document is a form on a website) or other specific user interaction may be determined by monitoring the user's actions in relation to the document. In an embodiment, different user interaction may be used differently to weight the document. For example, passive interaction in which user input (e.g., discussion board submissions) is not submitted by the user may be weighed less than active user interaction in which a user provides input. In an embodiment, the user interaction may be stored in metadata associated with the document or associated with a locally cached version of a web page displaying the document. In another embodiment, cookies may be used to store a user interaction with a document.

Next each of the user selections is weighted proportionately to the respective user interaction to generate a new search criteria (Step 506). For example, if a user spends 70% of total interaction time with document A and 30% of total interaction time with document B, 70% of the suggested search criteria may be generated using keywords from document A and 30% of the search criteria may be generated using keywords from document B. Another example may involve 50% of the suggested search criteria based on the original search criteria and the remaining 50% of the suggested search criteria based on the user selections in proportion to the user interaction.

Once the suggested search criteria is generated, new search results may be obtained (Step 508) and presented (Step 510). Steps 508 and 510 are essentially the same as steps 310 and 312 in FIG. 3, discussed above.

Modifying Content Based on Multiple User Selections

In an embodiment, when a user has made multiple user selections within the search results, the search results may be modified based on the multiple user selections. For example, the documents corresponding to the different user selections may be compared for matching words, subject matter, or other overlapping content. The overlapping content may then be used in any of the methods described above. For example, the overlapping content may be used as a new search criteria to generate results, may be used for determining relevance of the remaining search results, may be used for re-ranking the remaining search results, or may otherwise be used to modify the content of a search results webpage.

In an embodiment, trends within user selected search results may be analyzed. For example, if searches for a general topic and then selecting search results associated with particular sub-topics within the general topic, an analysis may determine that a user first selected search results corresponding to sub-topic A and then switched to selecting search results corresponding to sub-topic B. In this example, the content of the search results page may be modified based on relevance to sub-topic B while search results associated with sub-topic A may be indicated as less relevant or removed from the search results.

Figure 6:
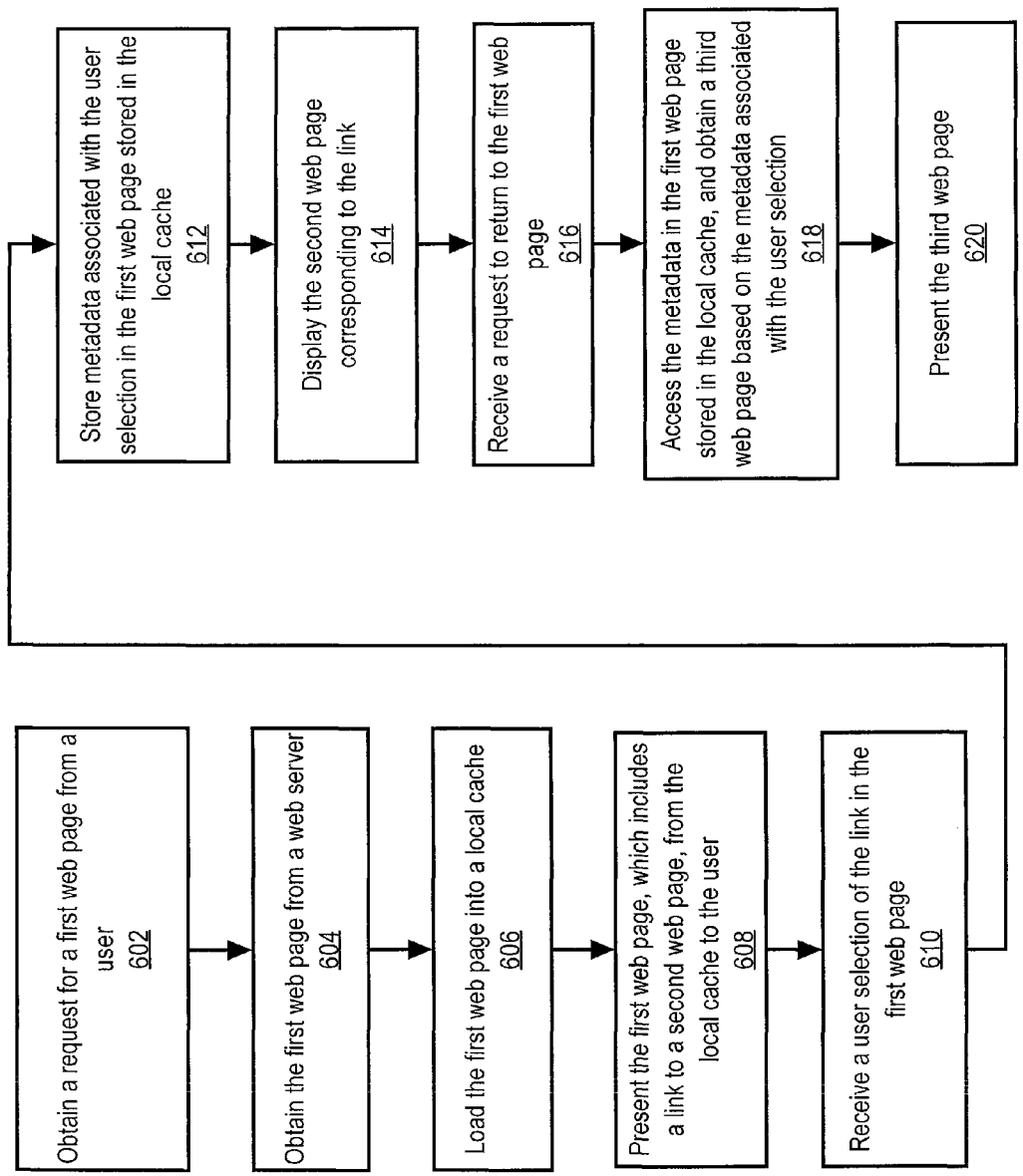
FIG. 6 is a flow diagram illustrating an embodiment for obtaining a new or modified web page in response to a user request to reload a previous web page.

Presenting a Modified/New Webpage in Response to a Request for Reloading a Previous Webpage Based on User Selection In an embodiment illustrated in FIG. 6, new web page contents are presented in response to a request to present previously displayed web page contents. The new web page contents may be presented on a new web page all together or may be presented on a modified version of the web page locally stored in cache.

Initially, based on user input, a request for a first web page is received (Step 602). The request for the first web page may correspond to any user input resulting in the request for a web page with any content. For example, a user may initiate a query resulting in a request for a web page containing search results. Another example may involve a user selecting a link resulting in a request for a web page associated with the link. In yet another example, the request for a web page may be made simply be a user opening a web browser application which by default requests and loads a home page configured for the web browser.

In response, the first web page is obtained from a web server (Step 604). For example, when a user submits a search criteria on a webpage found at www.yahoo.com, the search results based on the search criteria are obtained from a web page. Another example may involve a user opening a web browser application, in which case a default home web page is obtained from a respective web server.

In an embodiment, the first web page is then stored into a local cache (Step 606). Those skilled in the art will appreciate that although the example specifically references a local cache, the first web page may be stored in type of local or non-local memory. The first web page stored locally in the cache is then displayed to a user (608). Furthermore, the first web page in this example includes a link corresponding to a second web page (i.e., a second document). Next, a user selection of the link on the first page which corresponds to the second web page is received (Step 610). The link may be selected by clicking on the link or using a keyboard to navigate to the link and selecting the link.

In an embodiment, in response to receiving a user selection of the link on the first web page, code is executed to store information associated with the link in the locally stored copy of the first web page (Step 612). For example, the link, the document corresponding to the link, the time the link was selected, or any other suitable information associated with the link may be stored in the locally cached first web page. In an embodiment of the invention, the information associated with the link is stored in the web page such that the information is not displayed when the web page is viewed using a web browsing application. Furthermore, the information may be stored in a predetermined field for storage of information related to user interaction within the first web page such as selection of the link. For example, the first web page may correspond to a search results web page, and the link may correspond to one of the search results. In this example, in response to receiving selection of the link, the link itself may be stored in the locally cached search results web page, or the document corresponding to the selected search result may be stored in the locally cached search results web page or elsewhere in the cache.

In an embodiment of the invention, the web browser application then displays the second web page instead of the first web page for a user to view (Step 614). The user may view and/or interact with the second web page in any suitable manner. However, in an embodiment, a request to return to, i.e., reload the first web page is received from the user (Step 616).

In response to receiving a request to reload the first web page, the locally stored first web page in cache is accessed (Step 618). Furthermore, the locally stored first web page is checked for any metadata associated with the user interaction on the first web page. Returning to the above example, in the locally stored search results web page, the search results web page would be checked for any information related to a user interaction with a search result. For instance, the link selected by the user would be identified based on the information stored in the search results web page. Thereafter, based on the user selected link (i.e., a document corresponding to the user selected link) new or modified content would be obtained and displayed (Step 620), as described in FIGS. 3-5 above.

Hardware Overview

Figure 7:
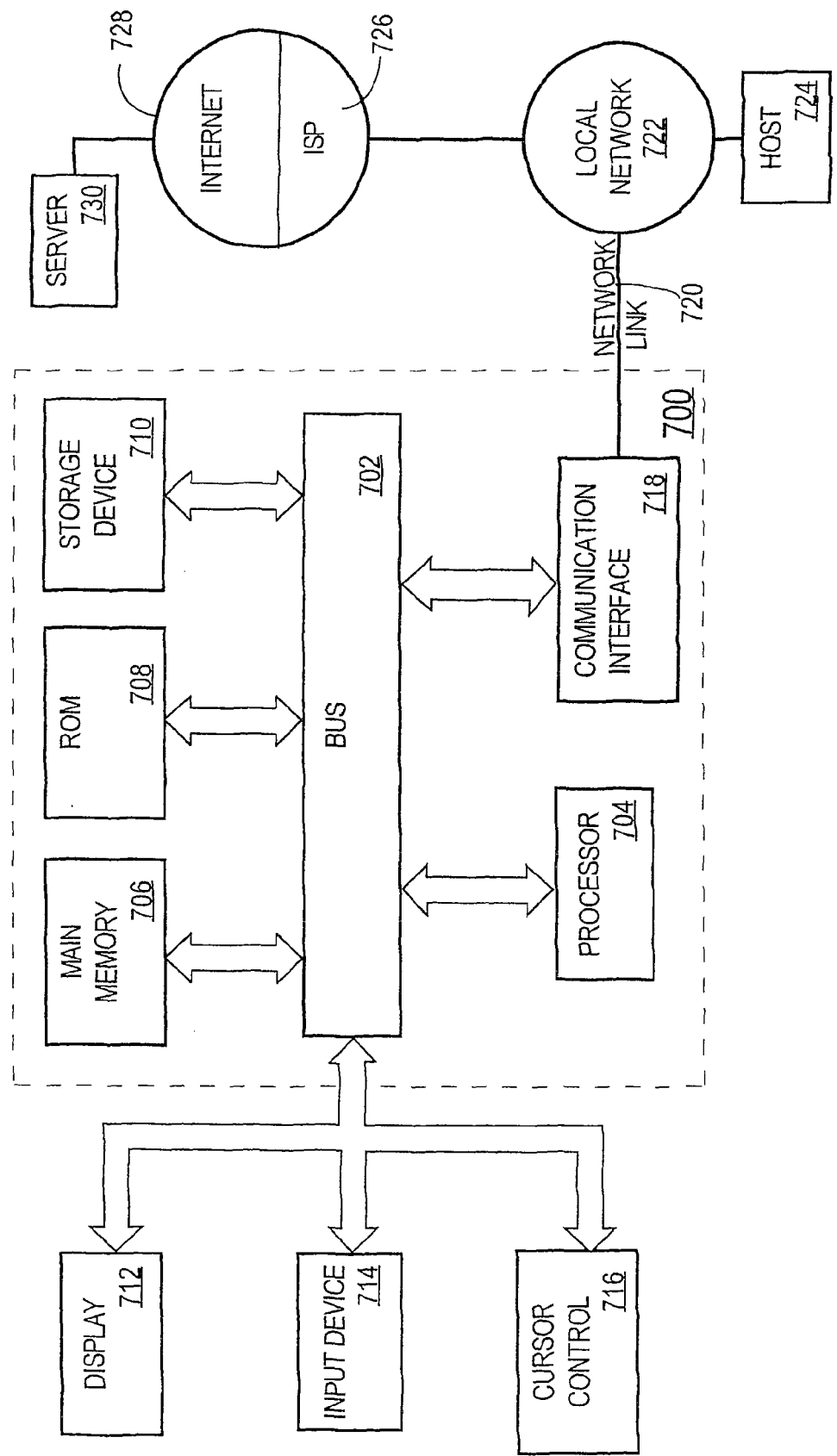
FIG. 7 is a block diagram illustrating a computer system that may be used in implementing an embodiment of the present invention.

FIG. 7 is a block diagram that illustrates a computer system 700 upon which an embodiment of the invention may be implemented. Computer system 700 includes a bus 702 or other communication mechanism for communicating information, and a processor 704 coupled with bus 702 for processing information. Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

The invention is related to the use of computer system 700 for modifying search results based on user selections within the search results. According to one embodiment of the invention, modifying search results based on user selections within the search results is provided by computer system 700 in response to processor 704 executing one or more sequences of one or more instructions contained in main memory 706. Such instructions may be read into main memory 706 from another computer-readable medium, such as storage device 710. Execution of the sequences of instructions contained in main memory 706 causes processor 704 to perform the process steps described herein. One or more processors in a multi-processing arrangement may also be employed to execute the sequences of instructions contained in main memory 706. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 704 for execution. Such a medium may take many forms, including but not limited to, non-volatile media, volatile media, and transmission media. Non-volatile media includes, for example, optical or magnetic disks, such as storage device 710. Volatile media includes dynamic memory, such as main memory 706. Transmission media includes coaxial cables, copper wire and fiber optics, including the wires that comprise bus 702. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 704 for execution. For example, the instructions may initially be carried on a magnetic disk of a remote computer. The remote computer can load the instructions into its dynamic memory and send the instructions over a telephone line using a modem. A modem local to computer system 700 can receive the data on the telephone line and use an infrared transmitter to convert the data to an infrared signal. An infrared detector coupled to bus 702 can receive the data carried in the infrared signal and place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the worldwide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are exemplary forms of carrier waves transporting the information.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718. In accordance with the invention, one such downloaded application provides for modifying search results based on user selections within the search results as described herein.

The received code may be executed by processor 704 as it is received, and/or stored in storage device 710, or other non-volatile storage for later execution. In this manner, computer system 700 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A machine-executed method, comprising:
    displaying a first webpage that includes a plurality of search results;
    receiving a user selection of a link on the first webpage that is being displayed, wherein a cached copy of the first webpage is stored in cache memory at a local client machine;
    responsive to receiving the user selection of the link:
        modifying, at the local client machine, the cached copy of the first webpage stored in the cache memory to include metadata that indicates the user selection of the link on the first webpage; and
        obtaining a second webpage that corresponds to the link;
        presenting the second webpage;
        wherein the second webpage is a search result in the plurality of search results included by the first page;
    receiving a request to reload the first webpage while the second webpage is being displayed;
    responsive to receiving the request to reload the first webpage:
        obtaining the metadata that indicates the user selection of the link on the first webpage from the cached copy of the first webpage stored in the cache memory;
        obtaining a third webpage based on the metadata; and presenting the third webpage, wherein the third webpage represents a new or modified search result page that is different from the first webpage.

2. The method of claim 1 further comprising creating the third webpage by performing a modification to the first webpage based on the metadata.

3. The method of claim 1, wherein modifying the first webpage stored in the cache memory to include metadata associated with the link comprises:
modifying contents of a field in the first webpage stored in the cache memory, wherein the contents of the field are not displayed when the first webpage is rendered in a web browser.

4. The method of claim 1, wherein receiving the request to reload the first webpage is based on a user selection of one of: a back button in a web browser and a Universal Resource Locator (URL) corresponding to the first webpage.

5. The method of claim 1 further comprising, prior to receiving the user selection of the link, displaying the first webpage in response to receiving a user selection of a search result of a plurality of search results.

6. The method of claim 1, wherein the metadata includes at least one of: a web address associated with the user selection, a document corresponding to the user selection, or a time the user selection was made.

7. The method of claim 1, wherein the link on the first webpage corresponds to a search result of a plurality of search results on the first webpage.

8. The method of claim 7, wherein the second webpage comprises a document corresponding to the search result of the plurality of search results.

9. The method of claim 7, wherein the third webpage comprises a modified plurality of search results based on the plurality of search results and the user selection.

10. The method of claim 9, wherein the user selection is assigned a weight proportional to an amount of time the second webpage was displayed, when the user selection is used as a part of basis for generating the modified plurality of search results.

11. A non-transitory computer readable storage medium comprising one or more sequences of instructions, which when executed by one or more processors cause:
displaying a first webpage that includes a plurality of search results;
receiving a user selection of a link on the first webpage that is being displayed, wherein a cached copy of the first webpage is stored in cache memory at a local client machine;
responsive to receiving the user selection of the link:
modifying, at the local client machine, the cached copy of the first webpage stored in the cache memory to include metadata that indicates the user selection of the link on the first webpage; and
obtaining a second webpage that corresponds to the link;
presenting the second webpage;
wherein the second webpage is a search result in the plurality of search results included by the first page;
receiving a request to reload the first webpage while the second webpage is being displayed;
responsive to receiving the request to reload the first webpage:
obtaining the metadata that indicates the user selection of the link on the first webpage from the cached copy of the first webpage stored in the cache memory;
obtaining a third webpage based on the metadata; and
presenting the third webpage, wherein the third webpage represents a new or modified search result page that is different from the first webpage.

12. The non-transitory computer readable storage medium of claim 11, wherein the third webpage is a modification of the first webpage based on the metadata.

13. The non-transitory computer readable storage medium of claim 11, modifying the first webpage stored in the cache memory to include metadata associated with the link comprises:
modifying contents of a field in the first webpage stored in the cache memory, wherein the contents of the field are not displayed when the first webpage is rendered in a web browser.

14. The non-transitory computer readable storage medium of claim 11, wherein receiving the request to reload the first webpage is based on a user selection of one of: a back button in a web browser and a Universal Resource Locator (URL) corresponding to the first webpage.

15. The non-transitory computer readable storage medium of claim 11, wherein the first webpage is displayed after receiving a prior user selection of a prior search result of a plurality of prior search results.

16. The non-transitory computer readable storage medium of claim 11, wherein the metadata includes at least one of: a web address associated with the user selection, a document corresponding to the user selection, or a time the user selection was made.

17. The non-transitory computer readable storage medium of claim 11, wherein the link on the first webpage corresponds to a search result of a plurality of search results on the first webpage.

18. The non-transitory computer readable storage medium of claim 17, wherein the second webpage comprises a document corresponding to the search result of the plurality of search results.

19. The non-transitory computer readable storage medium of claim 17, wherein the third webpage comprises a modified plurality of search results based on the plurality of search results and the user selection.

20. The non-transitory computer readable storage medium of claim 19, wherein the user selection is assigned a weight proportional to an amount of time the second webpage was displayed, when the user selection is used as a part of basis for generating the modified plurality of search results.

* * * * *